United States Patent
Chicklis et al.

(10) Patent No.: US 6,810,052 B2
(45) Date of Patent: Oct. 26, 2004

(54) EYESAFE Q-SWITCHED LASER

(75) Inventors: Evan Chicklis, Nashua, NH (US); Scott Setzler, Manchester, NH (US)

(73) Assignee: Bae Systems Information and Electronic Systems Integration, Inc., Nashua, NH (US)

(*) Notice: Subject to any disclaimer, the term of this patent is extended or adjusted under 35 U.S.C. 154(b) by 164 days.

(21) Appl. No.: 09/841,727

(22) Filed: Apr. 26, 2001

(65) Prior Publication Data

US 2001/0036205 A1 Nov. 1, 2001

Related U.S. Application Data

(60) Provisional application No. 60/201,645, filed on May 2, 2000.

(51) Int. Cl.[7] ................................................. H01S 3/14
(52) U.S. Cl. ............................................ 372/39; 372/41
(58) Field of Search ............................. 372/39, 41, 10, 372/72, 75

(56) References Cited

U.S. PATENT DOCUMENTS

| | | | |
|---|---|---|---|
| 4,942,119 A | | 7/1990 | Ozin et al. |
| 5,022,040 A | * | 6/1991 | Pollack et al. ............... 372/69 |
| 5,038,358 A | | 8/1991 | Rand |
| 5,117,437 A | | 5/1992 | Rand |
| 5,166,948 A | | 11/1992 | Gavrilovic |
| 5,181,211 A | * | 1/1993 | Burnham et al. ............. 372/21 |
| 5,200,966 A | * | 4/1993 | Esterowitz et al. ........... 372/71 |
| 5,535,232 A | | 7/1996 | Bowman et al. |
| 5,557,624 A | * | 9/1996 | Stultz et al. .................. 372/11 |
| 5,652,756 A | * | 7/1997 | Stultz et al. .................. 372/10 |
| 5,682,397 A | | 10/1997 | Scheps |
| 6,047,013 A | | 4/2000 | Payne et al. |
| 6,179,830 B1 | * | 1/2001 | Kokubu ....................... 606/16 |
| 6,246,711 B1 | * | 6/2001 | Stultz et al. .................. 372/92 |
| 6,404,785 B1 | * | 6/2002 | Scheps ......................... 372/21 |
| 6,529,675 B1 | * | 3/2003 | Hayden et al. ............. 385/141 |

OTHER PUBLICATIONS

Lees, et al. "980nm Diode–pumped erbium 3+/ytterbium3+ doped Q–switched fiber laser", Electronics Letters, Vo. 31, No. 21, Oct. 1995, pp. 1836–1837.*

Kubo, et al. "Diode–Pumped Lasers at Five Eye–Safe Wavelengths", Journal of Quantum Electronics, Vo. 28, No. 4, Apr. 1992, pp. 1033–1040.*

* cited by examiner

Primary Examiner—David Porta
Assistant Examiner—Daviene Monbleau
(74) Attorney, Agent, or Firm—Devine Millimeter & Branch; Paul C. Remus

(57) ABSTRACT

An eyesafe, Q-switched, laser system for target identification, ranging, and gated viewing purposes features a Resonant Pumped Erbium (RPE) laser, which exhibits a longer storage lifetime that minimizes the number of diodes needed to pump optical parametric oscillators (OPOs) or Raman converters. The RPE laser is in band to $I^2$ devices.

9 Claims, 4 Drawing Sheets

Blue: Yb - Er Transfer
Green: $^4I_{13/2}$ Quenching
Red: Er - Yb Back Transfer
〰️→ Multiphoton Relaxation

EYESAFE Q-SWITCHED LASER

RELATED APPLICATION

Applicants hereby claim benefit of the priority date for U.S. Provisional patent application Ser. No. 60/201,645, filed May 2, 2000.

FIELD OF THE INVENTION

The present invention relates to lasers, and more particularly, to high energy storage, high gain, eyesafe, Er lasers useful for military and commercial applications.

BACKGROUND OF THE INVENTION

A need has emerged for the development of high gain, high energy Q-switched lasers for military and commercial applications that operate in the eyesafe region ($\lambda \sim >1.5$ microns). The military requirement is the augmentation of fire control systems with a system that can identify the target (Target ID). The Target ID function is achieved with an electro-optic sensor that illuminates the target with high energy, short pulse eyesafe radiation (1.5 microns) and generates a real time image with the return radiation using a gated image intensifier or an array of high speed photo to diode.

Commercial applications of high gain eyesafe lasers include the development of free space communication nodes of conventional fiber optic networks. Free space networks which are capable of transmitting and receiving the data of fiber optic communication links can dramatically reduce the capital cost of point to point fiber optic cable installation. Free space communication would be enabled by the development of high gain Er amplifier modules that would amplify the output of existing fiber networks to achieve reliable free space communications. Free space communications must operate in all weather environments requiring the transmission of high power; hence the high gain requirement.

Conventional technology utilizes Yb sensitized Er glass or Er fiber lasers. This technology has found wide military (eyesafe rangefinders) and commercial (fiber communications) application. However, these technologies (Yb—Er glass and fiber lasers) cannot provide the high gain, high energy storage properties needed for generation of moderate to high energy laser radiation for military application or the high gain needed for free space communication applications. The problem with the Yb—Er glass is the requirement of high population densities in the upper level, which densities are needed to achieve gain and high energy. High sensitizer (Yb) concentrations are needed to absorb the pump energy, and transfer it to the upper laser level. The high population densities at the upper laser level generally back transfer, also known as upconversion, to the sensitizer, thus limiting the amount of energy that can be stored. Gain is proportional to stored energy, stored energy to laser output. Yb—Er glass technology cannot provide high energy laser output or high gain.

An alternative technology for military applications is the use of diode pumped Nd lasers driving non-linear devices which shift the one micron laser output to the eyesafe region ($\lambda > 1.5$ microns). This technology is capable of high Q-switched eyesafe energies but is very costly to implement. High cost is the result of the short storage lifetime of Nd lasers (200 $\mu$s). Typical diode bars emit 100 watts of peak power. The energy stored in the Nd laser is proportional to the product of the diode peak power×the storage lifetime of the laser material.

SUMMARY OF THE INVENTION

In accordance with the present invention there is provided an eyesafe, Q-switched laser for target identification purposes or an Er gain medium for amplification of Er fiber communication links. The invention comprises a resonant pumped Er laser configured as a Q-switched oscillator or multipass amplifier.

The eyesafe Q-switched laser or multipass amplifier consists of unsensitized Er, having a lifetime of ~10 milliseconds for a 1.5 micron transition. The range of concentrations is approximately between 0.1 and 2.0% of the active ion. The oscillator material can comprise erbium dispersed in a number of crystalline or glass media. The laser system has the following performance values:

Energy/pulse: between approximately 250 and 300 mJ

Wavelength: ~1.5 microns

Pump source: ~30 to 60 W at 1.5 microns for ~10 ms

Gain: gain coefficient ~1 cm$^{-1}$

It is an object of the present invention to provide a low cost, Q-switched laser for target identification, ranging, and gated viewing.

It is another object of this invention to provide a means of amplifying the output of a fiber communications link.

It is another object of this invention to provide a Resonant Pumped Erbium (RPE) laser, which exhibits a long storage lifetime, thereby minimizing the number of diodes needed to achieve high stored energy and high gain.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention features an eyesafe, Q-switched laser for target identification, ranging, and gated viewing purposes. The laser system comprises a Resonant Pumped Erbium (RPE) laser, which exhibits a longer storage lifetime that minimizes the number of diodes needed to pump the optical parametric oscillators (OPOs) or Raman converters. The RPE laser is in band to I$^2$ devices.

Current technology utilizes diode pumped Nd bars driving non-linear devices to achieve eyesafe output for gated imaging. The physical calculations for determining the number of diodes that is needed for the system is easily obtained. Each diode produces "P" watts for some time duration, "T", where T is determined by the fluorescence lifetime of the laser material. For example, for ND:YAG, T=200 $\mu$s. Therefore for 50 W bars, the total energy of each diode bar is dictated by the equation:

$$E_o = P_T = 10 \text{ mJ} \tag{Eq. 1}$$

Diode to Nd conversion efficiency is 25%, so each diode bar produces 2.5 mJ of Q-switched, 1 micron radiation. At 30%, conversion of 1 micron to eyesafe, each diode bar produces approximately 1 mJ of eyesafe output.

Spontaneous emission rates of atomic transitions exhibit a V 3 dependence on energy above the ground state, times the oscillator strength of the transition. Therefore, a transition at λ~2 microns above the ground state exhibits $(2/0.8)^3=15$ times the storage lifetime of the Nd transition at 0.8 microns above the ground state, provided both transitions are of the same oscillator strength.

Realization of long storage lifetime in infrared transitions requires that two other conditions be met:

a) the state must be free from lower lying states that non-radiatively quench the excited state (multiphoton relaxation); and b) the state must not be subject to decay modes that depopulate the state at high inversion levels ("upconversion", or energy transfer).

Three ions meet the (a) condition, all exhibiting purely radiative transitions in fluoride hosts:

$^5I_7$ (Ho) at 2 microns,
$^3F_4$ (Tm) at 1.9 microns, and
$^4I_{13/2}$ (Er) at 1.5 microns.

Figure 1:
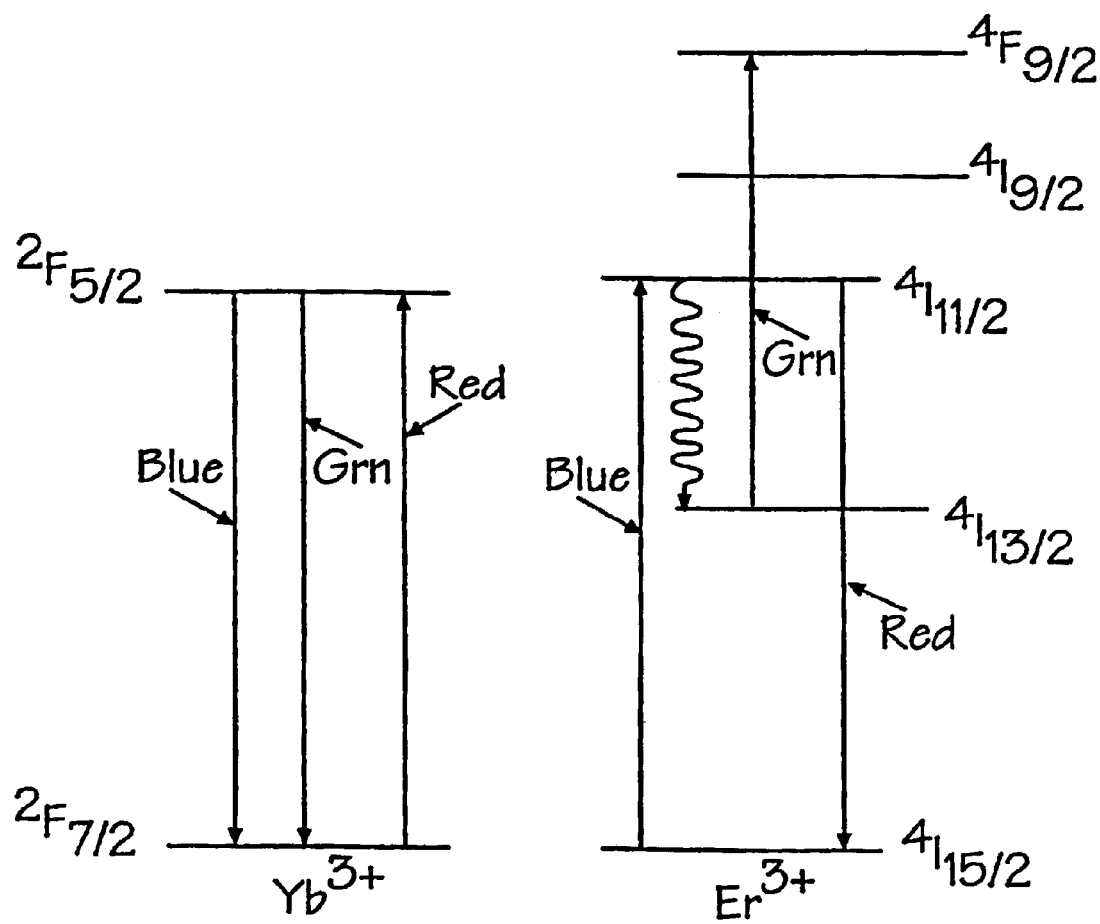
FIG. 1 illustrates a schematic diagram of an upconversion mechanism avoiding cross relaxation.

The aforementioned condition (b) is more subtle. In order to avoid upconversion at high stored energy densities, it is necessary to avoid "cross relaxation". This phenomenon is illustrated in FIG. 1.

Two ions, initially excited to states "B" and "A", cross relax, leaving one ion in "D" and the other ion in "C". The de-excitation occurs at a rate proportional to:

$$\eta A \cdot \eta B \cdot f(V_A - V_B) \quad \text{(Eq. 2)}$$

where ηA and ηb are the population densities of states A and B, respectively, and f is a function of the energy mismatch between the transitions.

Figures 2A, 2B:
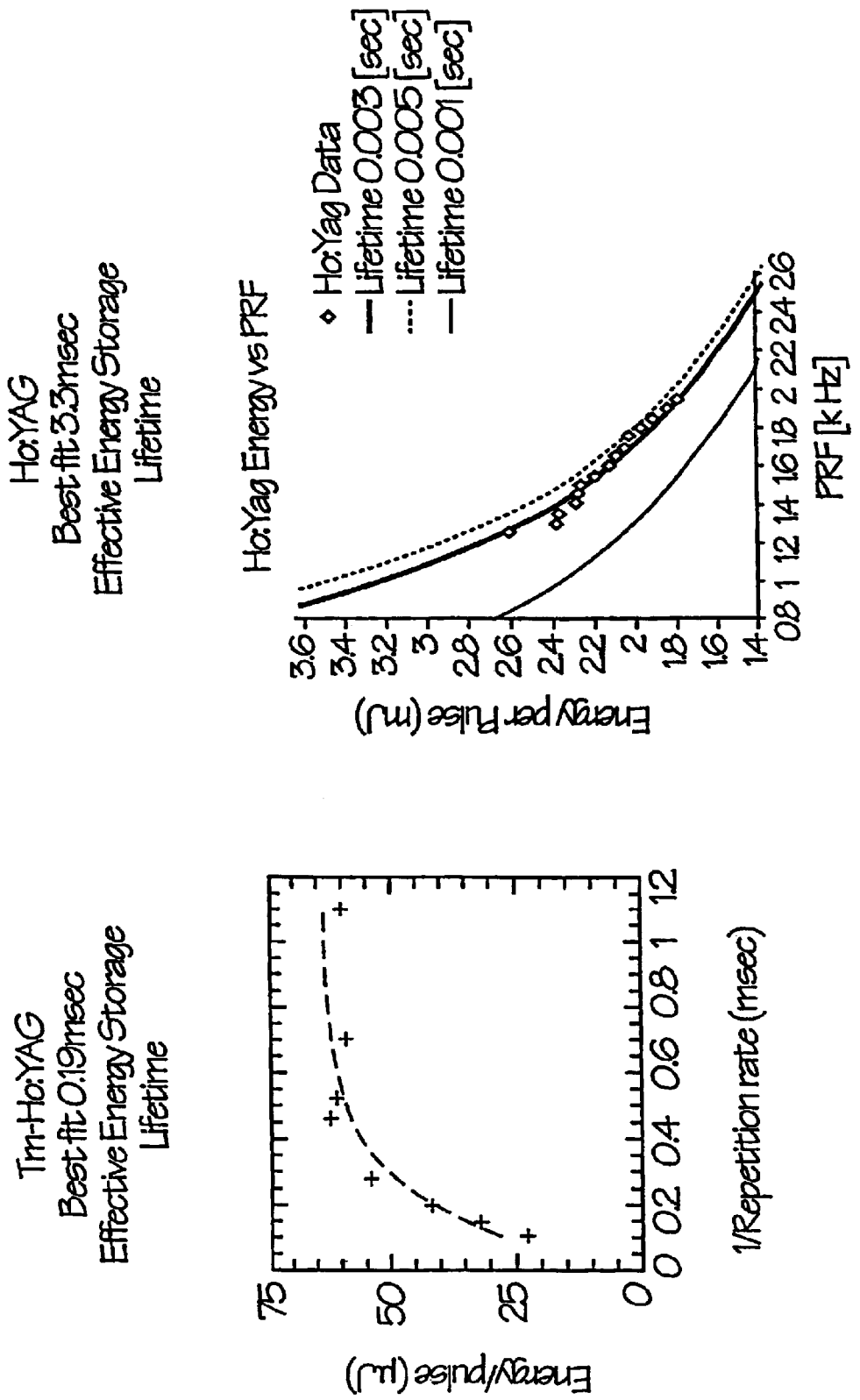
FIGS. 2a and 2b are graphical views of energy storage lifetime versus Pulse Repetition Frequency for Tm—Ho and Ho YAG laser systems, respectively.

Referring to FIG. 2, the measured Tm—Ho:YAG pulse energy is illustrated as a function of Pulse Repetition Frequency (RPF). The laser is pumped to a high gain and the effective lifetime is inferred from the energy/pulse vs. PRF. From this data, a lifetime of 190 μs is achieved, in marked contrast to the spectroscopic lifetime of 5 ms for the $^5I_7$ transition.

Figure 3:
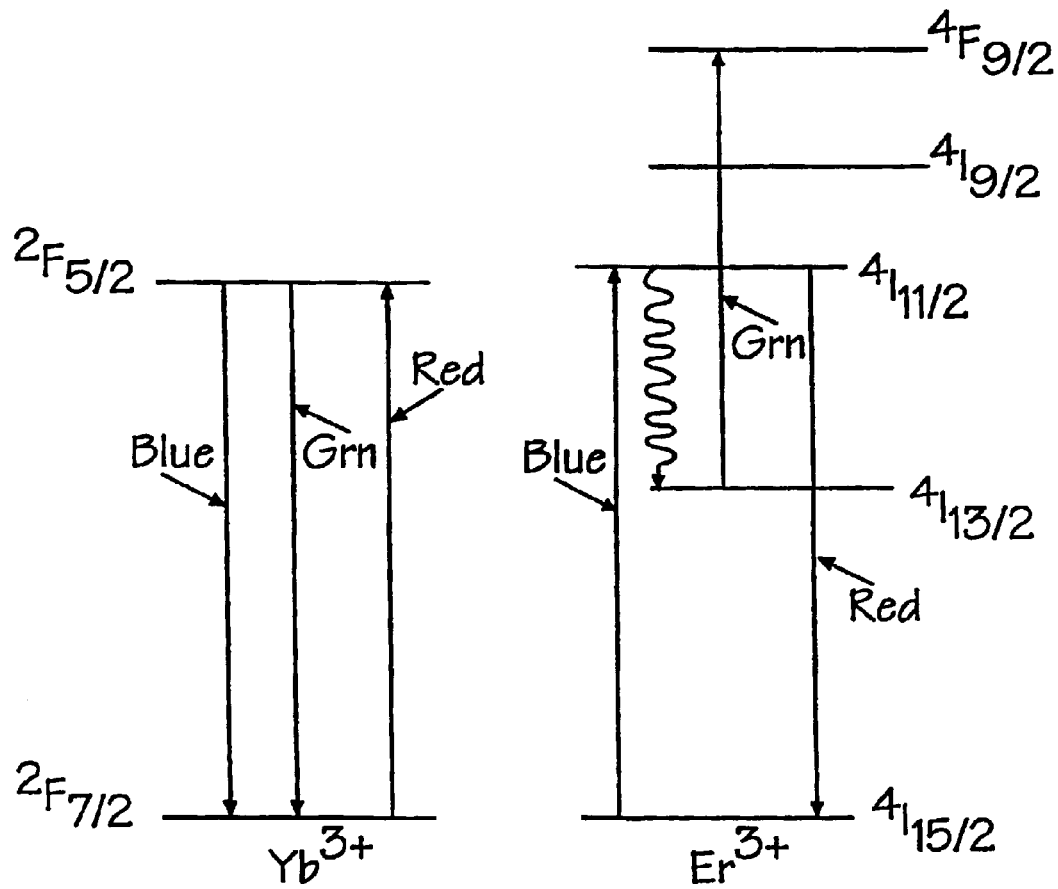
FIG. 3 illustrates a schematic view of upconversion mechanisms in Yttrium—Erbium glass.

Referring to FIG. 3, the measured Tm—Ho:YAG pulse energy is illustrated as a function of Pulse Repetition Frequency (PRF). The laser is pumped to a high gain and the effective lifetime is inferred from the energy/pulse vs. PRF. From this data, a lifetime of 190 μs is achieved, in marked contrast to the spectroscopic lifetime of 5 ms for the 'I transition.

It has been demonstrated that in unsensitized Ho:YAG in dilute concentration, upconversion is negligible even at high gain. FIG. 2 alone shows the pulse energy vs. PRF of Ho:YAG, from which a lifetime of 3 ms is inferred. Ho:YAG is being developed for high pulse energies in 3D Lidar and remote sensing applications. A 10 mJ/diode bar of Q-switched, two micron output has already been demonstrated. However, this two micron transition is out of band to $I^2$ devices.

Referring to FIG. 3, the level diagrams in the case of Tm—Ho, as the population of the $^4I_{13/2}$ state, illustrate increased upconversion, via the occurrence of near resonant cross relaxation. The spectroscopic lifetime of approximately 10 ms (in fluorides) is rapidly reduced by the rate for this cross relaxation process to the extent that it becomes of the order of the pumping rate. At this point, the population density is "clamped"; stronger pumping does not increase stored energy. Yb—Er glass lasers are notoriously low gain (i.e., low energy storage) devices.

The invention considers dilute, unsensitized Er doped crystals (YLF, YAG, Yttrium Orthoaluminate [YAlO]) to be a means of generating high pulse energy for diode pumped, eyesafe lasers.

In unsensitized, low-concentration, Er crystals, upconversion is inherently a weak process; the spectroscopic lifetime is realized at useful gain levels. This means that each diode bar will store:

10 ms/0.2 ms=50 times the energy of an Nd laser.

Use of unsensitized Er lasers at 1.5 microns has not been attempted in the past because of difficulties in pumping the first excited state of Er around 1.5 microns.

Figure 4:
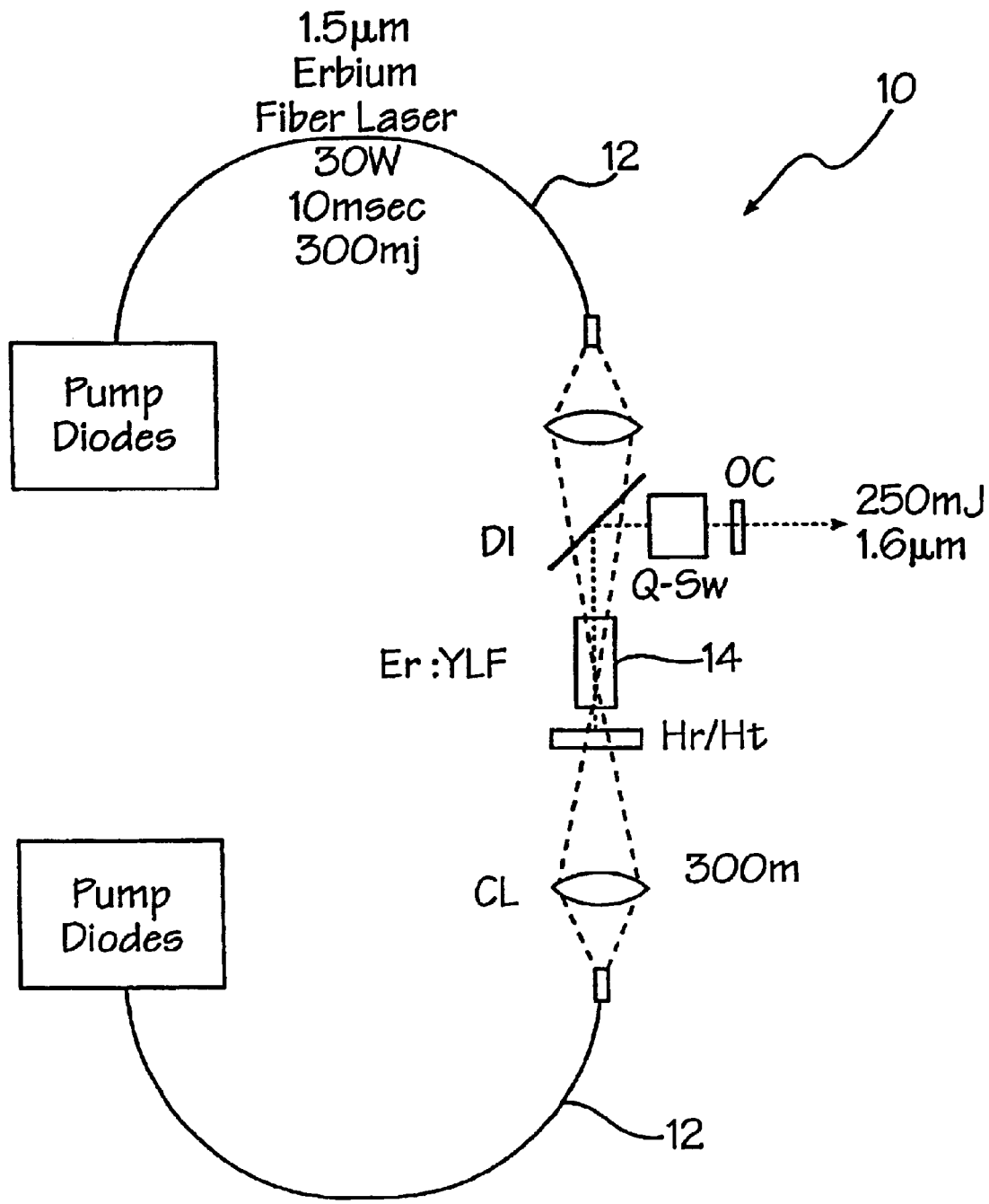
FIG. 4 depicts a schematic of a fiber laser, pumped, eyesafe system in accordance with this invention.

With reference to FIG. 4, Er fiber lasers, 1.5 micron diode bars, and diode pumped Yb—Er glass in long pulse lasers, are illustrated in the system of this invention. FIG. 4 is a schematic view of a 250 mJ, Q-switched, eyesafe laser system, arrow 10. The pump source for the Erbium—Yttrium Lithium Fluoride laser 14 comprises two 30 W Er fiber lasers 12 emitting at 1.5 microns. Sixty watts of pumped energy stored for 10 ms correspond to 600 mJ of pumped energy.

At 50% net coupling, an extraction efficiency is obtained in excess of 250 mJ. This is in stark contrast to a system featuring a 400 diode bar pumped Nd:YAG OSC AMP-AMP (1J) pumping a potassium titanium oxide phosphate (KTP) or a potassium titanyl arsenate (KTA) Optical Parametric Oscillator-Optical Parametric Amplifier (OPO-OPA), generating 250 mJ of eyesafe output.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An eye-safe, Q-switched laser system having a number of diodes for optical pumping, said system comprising:

a resonant pumped erbium laser having dilute concentrations of unsensitized Erbium and a storage lifetime of at least 4 msec, thereby minimizing said number of diodes needed to pump said laser; and an energy/pulse between approximately 250 mJ and approximately 300 mJ.

2. The system in accordance with claim 1, wherein the unsensitized concentration of Erbium is between about 1% and about 2% of active ion, said Erbium having the storage lifetime of approximately 10 msec for a 1.5 micron transition.

3. The system in accordance with claim 2, further comprising a crystalline host for the Erbium.

4. The system in accordance with claim 1, wherein the laser has a wavelength of approximately 1.5 microns.

5. The system in accordance with claim 1, wherein said number of diodes pump approximately 30 to 60 W at 1.5 microns wavelength for approximately 10 msec.

6. A high-energy, eye-safe, Q-switched laser comprising:

a resonant pumped erbium laser with dilute concentrations of unsensitized Erbium, wherein the unsensitized Erbium concentration is between about 1% and about 2% to provide a greater amount of energy to be stored; and a first excited state of the Erbium that is pumped at approximately 1.5 microns.

7. The laser of claim 6, further comprising an Erbium:Yttrium Lithium Fluoride oscillator pumped by the Erbium laser.

8. The laser of claim 6, further comprising an energy/pulse between approximately 250 and 300 mJ.

9. The laser of claim 6, further comprising a plurality of diodes pumping approximately 30 to 60 W at about 1.5 microns wavelength, for approximately 10 ms.

* * * * *